(12) United States Patent
Fan et al.

(10) Patent No.: US 11,880,606 B2
(45) Date of Patent: Jan. 23, 2024

(54) MOVING VIRTUAL VOLUMES AMONG STORAGE NODES OF A STORAGE CLUSTER BASED ON DETERMINED LIKELIHOOD OF DESIGNATED VIRTUAL MACHINE BOOT CONDITIONS

(71) Applicant: Dell Products L.P., Round Rock, TX (US)

(72) Inventors: Huijuan Fan, Chengdu (CN); Chi Chen, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 22 days.

(21) Appl. No.: 17/394,697

(22) Filed: Aug. 5, 2021

(65) Prior Publication Data

US 2023/0009160 A1    Jan. 12, 2023

(30) Foreign Application Priority Data

Jul. 12, 2021  (CN) .......................... 202110783640.4

(51) Int. Cl.
    *G06F 12/00*     (2006.01)
    *G06F 13/00*     (2006.01)
    *G06F 3/06*      (2006.01)

(52) U.S. Cl.
    CPC .......... *G06F 3/0665* (2013.01); *G06F 3/0604* (2013.01); *G06F 3/067* (2013.01); *G06F 3/0647* (2013.01); *G06F 3/0659* (2013.01)

(58) Field of Classification Search
    CPC .... G06F 3/0665; G06F 3/0604; G06F 3/0647; G06F 3/0659; G06F 3/067

(Continued)

(56) References Cited

U.S. PATENT DOCUMENTS 6,216,202 B1 *  4/2001  D'Errico ............... G06F 3/0665
                                              711/112
8,209,290 B1 *  6/2012  Dowers, II .......... G06F 11/1469
                                              707/640

(Continued)

OTHER PUBLICATIONS

NVM Express, "NVM Express, Revision 1.3," NVM Express, May 1, 2017, 282 pages.

(Continued)

*Primary Examiner* — Sheng Jen Tsai
(74) *Attorney, Agent, or Firm* — Ryan, Mason & Lewis, LLP (57) ABSTRACT

An apparatus comprises a processing device configured to obtain information characterizing historical boot times for virtual machines associated with virtual volumes hosted on a storage cluster comprising a plurality of storage nodes, and to determine, based at least in part on the obtained information, whether any of the storage nodes has at least a threshold likelihood of experiencing a designated virtual machine boot condition during a given time period. The processing device is further configured, responsive to determining that a first one of the storage nodes has at least the threshold likelihood of experiencing the designated virtual machine boot condition during the given time period, to identify a subset of the virtual machines associated with a subset of the virtual volumes hosted on the first storage node and to move at least one of the subset of the virtual volumes to a second one of the storage nodes.

17 Claims, 6 Drawing Sheets

(58) Field of Classification Search
USPC .......................................................... 711/154
See application file for complete search history.

(56) References Cited

U.S. PATENT DOCUMENTS

| | | | | |
|---|---|---|---|---|
| 9,251,343 | B1* | 2/2016 | Vincent | G06F 21/566 |
| 9,256,452 | B1* | 2/2016 | Suryanarayanan | G06F 9/45558 |
| 9,767,274 | B2* | 9/2017 | Banga | G06F 21/53 |
| 9,792,150 | B1* | 10/2017 | Rangari | G06F 9/45558 |
| 10,310,767 | B1* | 6/2019 | Chopra | G06F 9/45558 |
| 10,545,776 | B1* | 1/2020 | Kowalski | G06F 9/45558 |
| 10,877,823 | B1* | 12/2020 | Lawrence | G06F 9/542 |
| 10,901,857 | B1* | 1/2021 | Chopra | G06F 3/0617 |
| 11,169,727 | B1* | 11/2021 | Doucette | G06F 3/0604 |
| 2007/0180087 | A1* | 8/2007 | Mizote | G06F 9/5027 718/104 |
| 2007/0180509 | A1* | 8/2007 | Swartz | G06F 9/4406 726/9 |
| 2007/0192466 | A1* | 8/2007 | Nahum | G06F 9/4416 709/223 |
| 2009/0113416 | A1* | 4/2009 | Bealkowski | G06F 8/65 717/177 |
| 2009/0276771 | A1* | 11/2009 | Nickolov | H04L 67/1008 718/1 |
| 2010/0095105 | A1* | 4/2010 | Sevak | G06F 9/4416 713/2 |
| 2010/0299309 | A1* | 11/2010 | Maki | G06F 11/1479 718/1 |
| 2013/0198459 | A1* | 8/2013 | Joshi | G06F 12/0871 711/133 |
| 2015/0319105 | A1* | 11/2015 | Ismail | G06F 3/0659 709/215 |
| 2015/0339150 | A1* | 11/2015 | Yanagisawa | G06F 9/45558 718/1 |
| 2016/0048365 | A1* | 2/2016 | Henderson | G06F 3/147 345/473 |
| 2016/0077918 | A1* | 3/2016 | Hwang | G06F 11/1469 714/6.23 |
| 2016/0140343 | A1* | 5/2016 | Novak | G06F 21/575 713/2 |
| 2018/0018109 | A1* | 1/2018 | Mueller | G06F 9/4406 |
| 2020/0349024 | A1* | 11/2020 | Bhagi | G06F 3/0671 |
| 2020/0409599 | A1* | 12/2020 | Liguori | G06F 3/0659 |
| 2020/0409600 | A1* | 12/2020 | Liguori | G06F 3/0671 |
| 2020/0409611 | A1* | 12/2020 | Olson | G06F 3/0617 |
| 2021/0173753 | A1* | 6/2021 | Chandra | G06F 9/4812 |
| 2021/0182161 | A1* | 6/2021 | Degaonkar | G06F 3/067 |
| 2022/0188138 | A1* | 6/2022 | Akkur Rajamannar | G06F 9/5072 |

OTHER PUBLICATIONS

VMware, "VMware vSphere Virtual Volumes (vVols): Getting Started Guide," Technical Documentation v 1.3, Sep. 2019, 40 pages.
VMware, "VMware vCenter Server," Datasheet, 2015, 2 pages.
VMware, "VMware vCenter Server, Centrally Managed Virtual Infrastructure Delivered with Confidence," Datasheet, 2018, 4 pages.
VMware, "The Architecture of VMware ESXi," White Paper, 2017, 10 pages.
VMware, "What's New: vSphere Virtual Volumes," VMware Storage Business Unit Documentation v 1.5, Aug. 2015, 25 pages.

* cited by examiner

MOVING VIRTUAL VOLUMES AMONG STORAGE NODES OF A STORAGE CLUSTER BASED ON DETERMINED LIKELIHOOD OF DESIGNATED VIRTUAL MACHINE BOOT CONDITIONS

RELATED APPLICATION

The present application claims priority to Chinese Patent Application No. 202110783640.4, filed on Jul. 12, 2021 and entitled "Moving Virtual Volumes Among Storage Nodes of a Storage Cluster Based on Determined Likelihood of Designated Virtual Machine Boot Conditions," which is incorporated by reference herein in its entirety.

FIELD

The field relates generally to information processing, and more particularly to techniques for managing information processing systems.

BACKGROUND

Information processing systems increasingly utilize reconfigurable virtual resources to meet changing user needs in an efficient, flexible and cost-effective manner. For example, cloud computing environments implemented using various types of virtualization techniques are known. These illustratively include operating system level virtualization techniques such as Linux containers. Such containers may be used to provide at least a portion of the cloud infrastructure of a given information processing system. Other types of virtualization such as virtual machines implemented using a hypervisor can additionally or alternatively be used.

SUMMARY

Illustrative embodiments of the present disclosure provide techniques for moving virtual volumes among storage nodes of a storage cluster based at least in part on determined likelihood of designated virtual machine boot conditions.

In one embodiment, an apparatus comprises at least one processing device comprising a processor coupled to a memory. The at least one processing device is configured to perform the step of obtaining information characterizing historical boot times for a plurality of virtual machines, the plurality of virtual machines being associated with a plurality of virtual volumes hosted on a storage cluster comprising a plurality of storage nodes. The at least one processing device is also configured to perform the step of determining, based at least in part on the obtained information characterizing the historical boot times for the plurality of virtual machines, whether any of the plurality of storage nodes has at least a threshold likelihood of experiencing a designated virtual machine boot condition during a given time period. The at least one processing device is further configured to perform the steps of, responsive to determining that a first one of the plurality of storage nodes has at least the threshold likelihood of experiencing the designated virtual machine boot condition during the given time period, identifying a subset of the plurality of virtual machines associated with a subset of the plurality of virtual volumes hosted on the first storage node and moving at least one of the subset of the plurality of virtual volumes associated with at least one of the subset of the plurality of virtual machines from the first storage node to a second one of the plurality of storage nodes.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
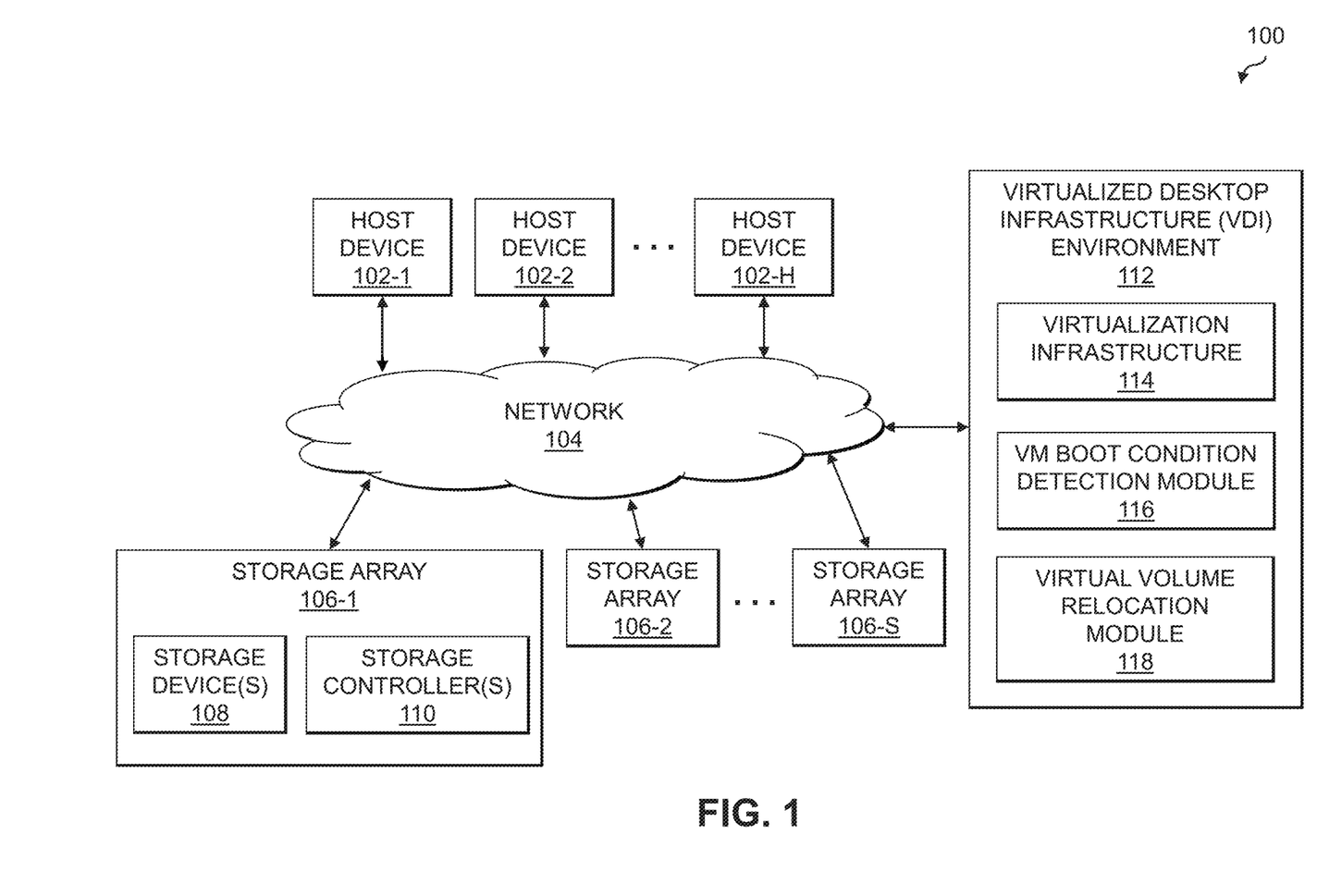
FIG. 1 is a block diagram of an information processing system configured for moving virtual volumes among storage nodes of a storage cluster based at least in part on determined likelihood of designated virtual machine boot conditions in an illustrative embodiment.

FIG. 1 shows an information processing system 100 configured in accordance with an illustrative embodiment to provide functionality for moving virtual volumes among storage nodes of a storage cluster based at least in part on determined likelihood of designated virtual machine (VM) boot conditions (e.g., to prevent or avoid excessive VM boots on a given storage node within some period of time). The information processing system 100 comprises one or more host devices 102-1, 102-2, . . . 102-H (collectively, host devices 102) that communicate over a network 104 with a virtual desktop infrastructure (VDI) environment 112. The VDI environment 112 includes virtualization infrastructure 114 for providing secure virtual desktop services in the form of VMs to multiple users (e.g., of the host devices 102) in one or more enterprises. User data for VMs provided using the virtualization infrastructure 114 may be stored on virtual volumes in one or more datastores. Each of the datastores may host multiple virtual volumes for one or more VMs. One or more storage arrays 106-1, 106-2, . . . 106-S (collectively, storage arrays 106) are also coupled to the network 104, and provide the underlying physical storage used by the datastores in the VDI environment 112. The storage arrays 106 may represent respective storage nodes of a storage cluster that hosts virtual volumes for the VMs provided using the virtualization infrastructure 114. The network 104 may comprise a storage area network (SAN).

The storage array 106-1, as shown in FIG. 1, comprises a plurality of storage devices 108 each storing data utilized by one or more of applications running on the host devices 102 (e.g., where such applications may include one or more applications running in virtual desktops or VMs in the VDI environment 112, including potentially the VMs themselves). The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 and virtualization infrastructure 114 of the VDI environment 112 illustratively comprise respective computers, servers or other types of processing devices capable of communicating with the storage arrays 106 via the network 104. For example, the virtualization infrastructure 114 of the VDI environment 112 may implement respective VMs of a compute services platform or other type of processing platform. Similarly, at least a subset of the host devices 102 may be implemented as respective VMs of a compute services platform or other type of processing platform. The host devices 102 and/or virtualization infrastructure 114 of the VDI environment 112 in such an arrangement illustratively provide compute services such as execution of one or more applications on behalf of each of one or more users (e.g., associated with respective ones of the host devices 102 and/or the VDI environment 112).

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102 (e.g., such as for virtual desktops or VMs in the VDI environment 112 utilized by the users of the host devices 102). These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The VDI environment 112, as noted above, includes virtualization infrastructure 114 for providing secure virtual desktop services in the form of VMs to multiple users (e.g., of the host devices 102) in one or more enterprises. Examples of processing platforms that may be used to provide the virtualization infrastructure 114 will be described in further detail below in conjunction with FIGS. 5 and 6. The VDI environment 112 further includes a VM boot condition detection module 116 and a virtual volume relocation module 118. The VM boot condition detection module 116 is configured to detect one or more designated VM boot conditions. At least one of such designated VM boot conditions includes at least a threshold number of VMs booting within a designated timeframe (e.g., a VM "boot storm" as will be described in further detail below). The virtual volume relocation module 118 is configured to relocate the virtual volumes associated with one or more VMs across different storage nodes (e.g., different ones of the storage arrays 106) to avoid overwhelming the resources of any particular one of the storage nodes due to concurrent bootup of VMs on that storage node within the designated timeframe.

At least portions of the functionality of the VM boot condition detection module 116 and virtual volume relocation module 118 may be implemented at least in part in the form of software that is stored in memory and executed by a processor.

Although shown as external to the host devices 102 and storage arrays 106 in the FIG. 1 embodiment, it should be appreciated that the VDI environment 112 in other embodiments may be implemented at least in part internal to one or more of the host devices 102 and/or one or more of the storage arrays 106 (e.g., such as on the storage controllers 110 of storage array 106-1). For example, one or more of the host devices 102 and/or storage arrays 106 may provide at least a portion of the virtualization infrastructure 114 that supports virtual desktops, VMs and datastores storing user data (e.g., virtual volumes) for the virtual desktops and VMs.

The host devices 102, storage arrays 106 and the VDI environment 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The host devices 102, the storage arrays 106 and the VDI environment 112 may be implemented on respective distinct processing platforms, although numerous other arrangements are possible. For example, in some embodiments at least portions of one or more of the host devices 102, the storage arrays 106 and the VDI environment 112 are implemented on the same processing platform. The VDI environment 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 and other portions of the system 100, such as the VDI environment 112, may in some embodiments be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the VDI environment 112 may be implemented at least in part in the first geographic location, the second geographic location, and one or more other geographic locations. Thus, it is possible in some implementations of the system 100 for different ones of the host devices 102, the storage arrays 106 and the VDI environment 112 to reside in different data centers.

Numerous other distributed implementations of the host devices 102, the storage arrays 106 and the VDI environment 112 are possible. Accordingly, the host devices 102, the storage arrays 106 and the VDI environment 112 can also be implemented in a distributed manner across multiple data centers.

Additional examples of processing platforms utilized to implement portions of the system 100 in illustrative embodiments will be described in more detail below in conjunction with FIGS. 5 and 6.

It is to be understood that the particular set of elements shown in FIG. 1 for moving virtual volumes among storage nodes of a storage cluster based at least in part on determined likelihood of designated VM boot conditions is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
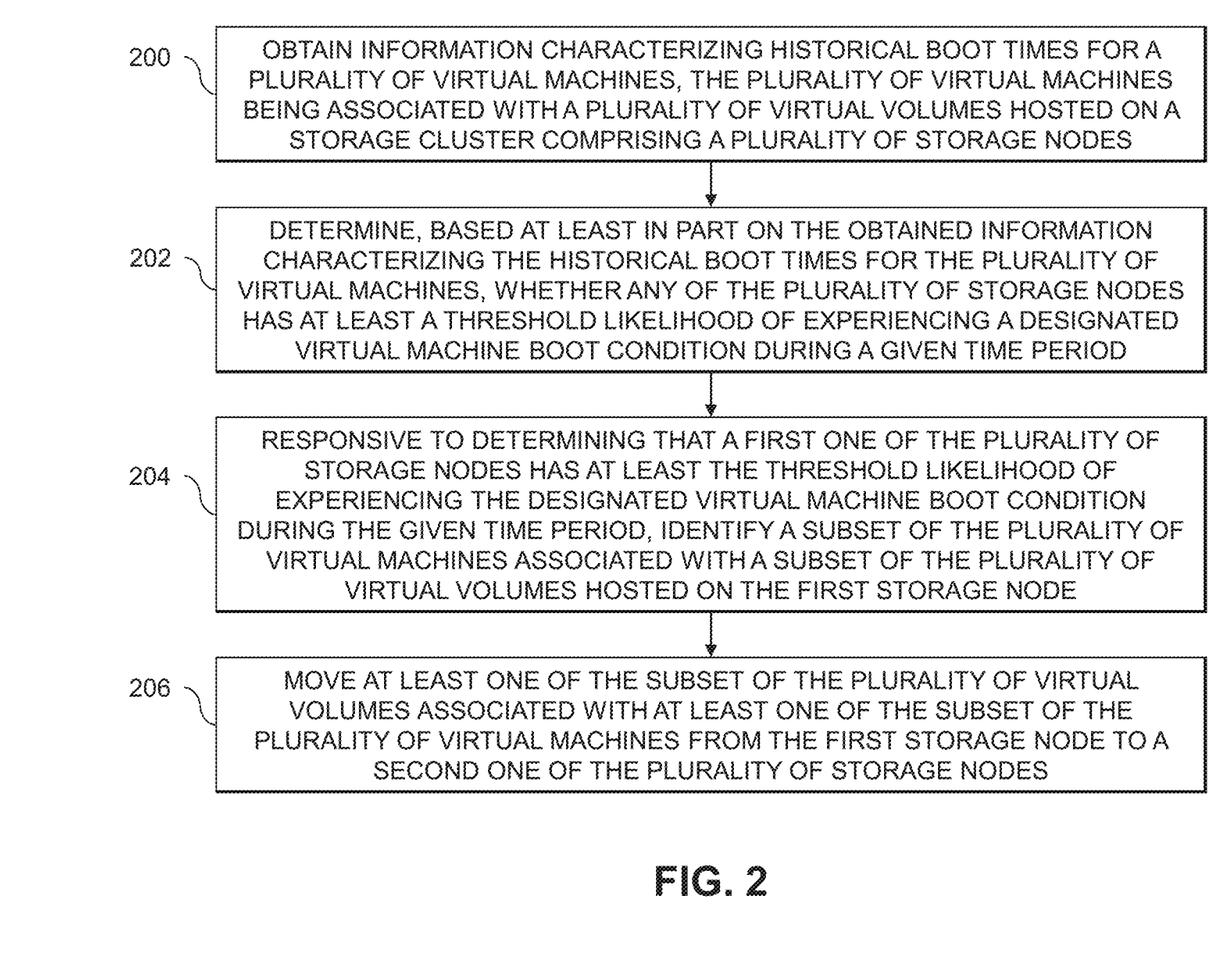
FIG. 2 is a flow diagram of an exemplary process for moving virtual volumes among storage nodes of a storage cluster based at least in part on determined likelihood of designated virtual machine boot conditions in an illustrative embodiment.

An exemplary process for moving virtual volumes among storage nodes of a storage cluster based at least in part on determined likelihood of designated VM boot conditions will now be described in more detail with reference to the flow diagram of FIG. 2. It is to be understood that this particular process is only an example, and that additional or alternative processes for moving virtual volumes among storage nodes of a storage cluster based at least in part on determined likelihood of designated VM boot conditions may be used in other embodiments.

In this embodiment, the process includes steps 200 through 206. These steps are assumed to be performed by the VDI environment 112 using the VM boot condition detection module 116 and the virtual volume relocation module 118. The process begins with step 200, obtaining information characterizing historical boot times for a plurality of VMs, the plurality of VMs being associated with a plurality of virtual volumes hosted on a storage cluster comprising a plurality of storage nodes (e.g., storage arrays 106). Step 200 may include monitoring creation times of one or more designated types of the plurality of virtual volumes. The one or more designated types of the plurality of virtual volumes may comprise at least one type of virtual volume that is created when a VM is powered on. The one or more designated types of the plurality of virtual volumes may also or alternatively comprise at least one type of virtual volume that contains copies of VM memory pages not retained in memory of the plurality of VMs. The one or more designated types of the plurality of virtual volumes comprise swap virtual volumes (e.g., virtual volumes that contain swap files for the VMs).

In step 202, a determination is made (based on the information obtained in step 200) as to whether any of the plurality of storage nodes has at least a threshold likelihood of experiencing a designated VM boot condition during a given time period. Responsive to determining that a first one of the plurality of storage nodes has at least the threshold likelihood of experiencing the designated VM boot condition during the given time period, a subset of the plurality of VMs associated with a subset of the plurality of virtual volumes hosted on the first storage node are identified in step 204. The designated VM boot condition may comprise at least a threshold likelihood of booting up more than at least a threshold number of the plurality of VMs on the first storage node during the given time period. The threshold number of the plurality of VMs may be selected based at least in part on resources available at the first storage node.

At least one of the subset of the plurality of virtual volumes associated with at least one of the subset of the plurality of VMs is moved from the first storage node to a second one of the plurality of storage nodes in step 206. In some embodiments, step 206 includes moving all of the virtual volumes associated with a given one of the subset of the plurality of VMs from the first storage node to the second storage node.

Step 206 may comprise generating a probability density function of bootup time for each of the subset of the plurality of VMs, determining a likelihood of each of the subset of the plurality of VMs booting up during the given time period utilizing the probability density functions of bootup time for the subset of the plurality of VMs, and selecting the at least one of the subset of the plurality of VMs based at least in part on the determined likelihood of each of the subset of the plurality of VMs booting up during the given time period. Selecting the at least one of the subset of the plurality of VMs based at least in part on the determined likelihood of each of the subset of the plurality of VMs booting up during the given time period comprises selecting a given one of the subset of the plurality of VMs whose probability density function has a highest probability of booting up during the given time period.

Step 206 may further comprise identifying a subset of the plurality of storage nodes as candidate destination storage nodes, each of the candidate destination storage nodes currently hosting less than a designated number of the plurality of virtual volumes, and selecting the second storage node from among the candidate destination storage nodes. The designated number of the plurality of virtual volumes may be determined based at least in part on an average number of virtual volumes hosted on each of the plurality storage nodes. Selecting the second storage node from among the candidate destination storage nodes may be based at least in part on determining a likelihood of each of the candidate storage nodes experiencing the designated VM boot condition during the given time period. Selecting the second storage node from among the candidate destination storage nodes may comprise selecting the candidate storage node with a lowest likelihood of experiencing the designated VM boot condition during the given time period.

A "boot storm" is a term used to describe the degradation of service that occurs when a significant number of VMs boot up within a very narrow timeframe. The boot storm may overwhelm a network with data requests, and can cripple system storage. A boot storm can be highly damaging to a VDI environment by draining performance and hindering productivity, and thus it is desirable to prevent boot storms from occurring. Illustrative embodiments provide techniques for avoiding boot storms, or more generally VM boot conditions that have potentially negative impacts on a VDI environment or other virtualization and IT infrastructure on which the VMs run. To do so, some embodiments appropriately architect and balance VM locations across server and storage nodes that provide a virtualization and IT infrastructure on which the VMs run. An appropriate architecture may be determined by measuring storage requirements, and allocating storage resources to meet both peak and average storage requirements.

Boot storm conditions may be common in various use cases. Consider, as an example, a typical office workday that sees employees or other end-users logging on to systems at around 8:30 AM and logging off around 5:00 PM. Servers utilized by the office may be able to handle usage throughout the duration of the workday, but issues may occur when too many VMs are booted up within a short period of time (e.g., between 8:30 AM and 9:00 AM). This commonly unavoidable synchronized startup can overpower system resources and storage, leaving users unable to fully access the system and their VMs until enough resources are made available.

In some data centers or other IT infrastructure that includes virtualized infrastructure (e.g., VDI environments including multiple VMs), SAN and NAS arrays may be virtualized. For example, a VMware vSphere® virtual volumes (VVols) integration and management framework may be used to virtualize SAN and NAS arrays, enabling a more efficient operational model that is optimized for virtualized environments and is centered on the application instead of the infrastructure.

VVols are an object type (e.g., a VMware® object type) that corresponds to a VM disk (VMDK). On a storage system, VVols reside in VVol datastores also referred to as storage containers. VVol datastores are a type of VMware® datastore which allows VVols to map directly to a storage system at a more granular level than VM filesystem (VMFS) and Network File System (NFS) datastores. While VMFS and NFS datastores are managed and provisioned at the LUN or filesystem level, VVols allow VMs or virtual disks to be managed independently. An end-user, for example, can create a VVol datastore based on underlying storage pools and allocate a specific portion of one or more storage pools to be used for the VVol datastore and its VVols. A hypervisor, such as VMware ESXi™, may use NAS and SCSI Protocol Endpoints (PEs) as access points for IO communication between VMs and their VVol datastores on a storage system.

VVols share a common storage operational model with VMware vSAN™, a leading hyperconverged infrastructure (HCI) solution. VMware vSAN™ is a software-defined enterprise storage solution that supports HCI systems. vSAN is fully integrated within VMware vSphere® as a distributed layer of software within the ESXi hypervisor. vSAN is configured to aggregate local or direct-attached storage to create a single storage pool shared across all hosts in a vSAN cluster.

Both VVols and vSAN utilize storage policy-based management (SBPM) to eliminate storage provisioning, and use descriptive policies at the VM or VMDK level that can be applied or changed quickly (e.g., in minutes). SBPM accelerates storage operations and reduces the need for specialized skills for storage infrastructure. Advantageously, VVols make it simpler to deliver and enable the right storage service levels according to the specific requirements of individual VMs. By having finer control over storage resources and data services at the VM level, an administrator of a virtualized infrastructure environment can create exact combinations and precisely deliver storage service levels.

In a virtualized infrastructure environment that utilizes VVols, a Swap VVol is created when a VM is powered on. The Swap VVol contains copies of the VM memory pages that are not retained in memory. Advantageously, VM boot time can be tracked and monitored from Swap VVol creation.

If many VMs boot within a short period of time and those VMs' associated VVols are located at the same storage node, this may lead to a boot storm that can cripple legacy system storage. Illustrative embodiments provide techniques for avoiding such boot storm conditions, by learning and analyzing VM boot patterns from VM boot time history data learned through monitoring Swap VVols for the VMs. VM boot "hot" points are found, and boot storms at such boot hot points are avoided by implementing balancing of VVols to different storage nodes. In some embodiments, VM boot probability distribution is learned from VM boot history data to identify potential boot storm points. The potential boot storm points are then avoided by implementing VVol balancing across different storage nodes in a storage cluster.

Figure 3:
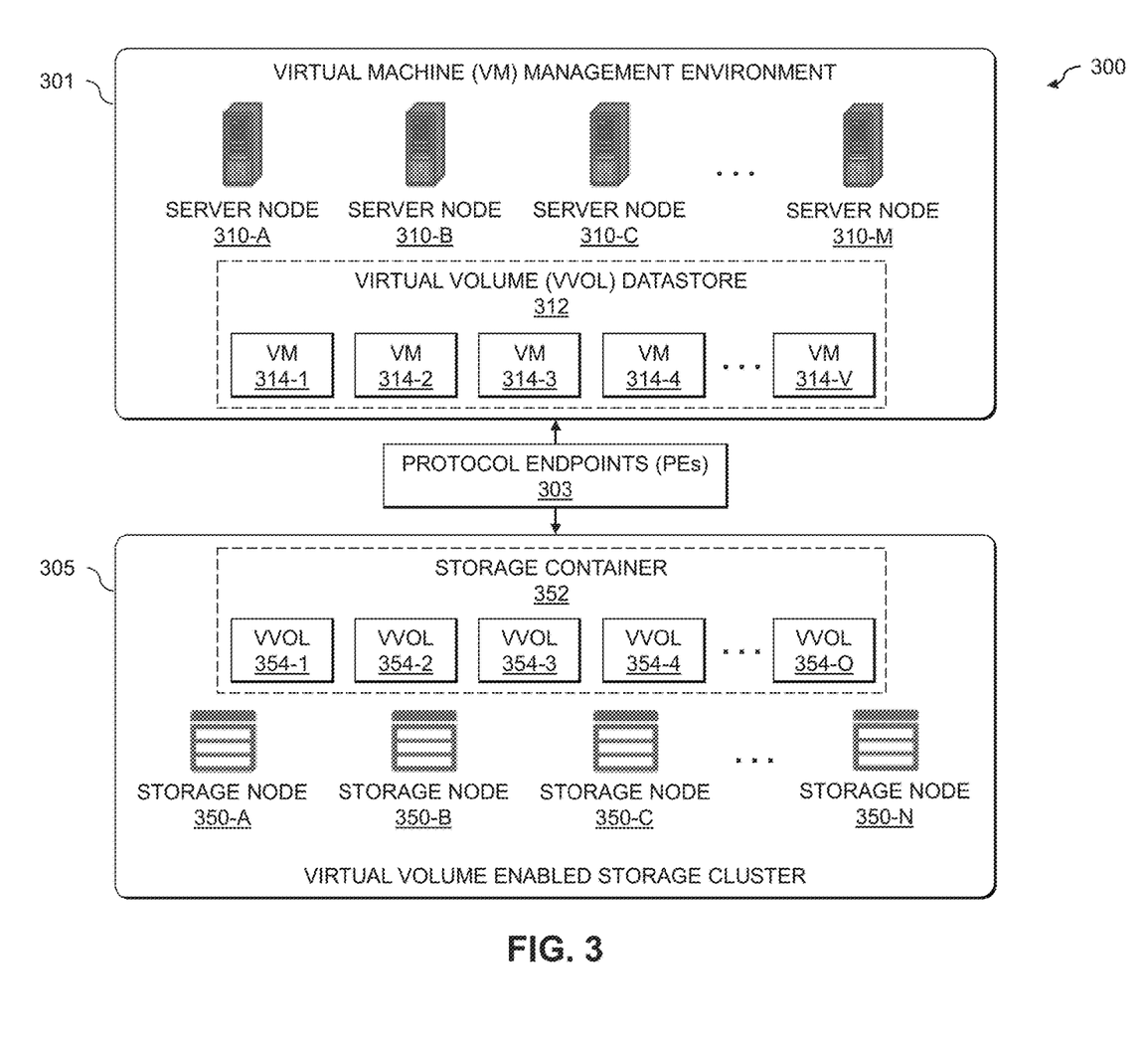
FIG. 3 illustrates a virtualization environment that utilizes virtual volume storage in an illustrative embodiment.

FIG. 3 shows a framework of a storage environment 300 utilizing VVol technology. The storage environment 300 includes a VM management environment 301 (e.g., a VMware vCenter® environment) coupled via PEs 303 to a virtual volume or VVol enabled storage cluster 305. The VM management environment 301 includes a set of server nodes 310-A, 310-B, 310-C, . . . 310-M (collectively, server nodes 310). The VM management environment 301 further includes a virtual volume (VVol) datastore 312 for a set of VMs 314-1, 314-2, 314-3, 314-4, . . . 314-V (collectively, VMs 314). The VVol enabled storage cluster 305 includes a set of storage nodes 350-A, 350-B, 350-C, . . . 350-N (collectively, storage nodes 350) and a storage container 352 comprising VVols 354-1, 354-2, 354-3, 354-4, . . . 354-O (collectively, VVols 354). It should be noted that the number M of server nodes 310 may be the same as or different than the number N of storage nodes 350.

The VVols 354 are exported to the VM management environment 301 (e.g., which may comprise server nodes 310 implementing respective ESXi hosts) through the PEs 303. The PEs 303 are part of the physical storage fabric, and establish a data path from the VMs 314 to their respective VVols 354 on demand. The storage nodes 350 enable data services on the VVols 354. The storage container 352 may provide a pool of storage capacity that is logically grouped into the VVols 354. The VVols 354 are created inside of the storage container 352. The storage container 352 may be presented to the server nodes 310 (e.g., ESXi hosts) of the VM management environment 301 in the form of the VVol datastore 312.

There are various different types of virtual volumes or VVols 354 which provide specific functions depending on their role in the VM management environment 301 (e.g., a VMware vCenter® and/or a VMware vSphere® environment). The different types of VVols include: configuration (Config) VVols; Data VVols; Swap VVols; Memory VVols; and Other VVols. There is one Config VVol per VM. The Config VVol holds information previously in the VM's directory (e.g., a .vmx file, VM logs, etc.). There is one Data VVol for every virtual data disk. The Data VVols hold a VM's system data, and is analogous to the VMDK file. There is one Swap VVol for each Swap file. As noted above, Swap VVols are created when VMs are powered on, and contain copies of the VM memory pages that are not retained in memory. There is one Memory VVol for each snapshot. The Memory VVol for a given VM contains a complete copy of the VM memory as part of a with-memory VM snapshot of the given VM. The Other VVol is a VMware vSphere® specific solution type.

Since the Swap VVol is only created when the VM is powered on, illustrative embodiments monitor the state of the Swap VVols associated with different VMs to check when the VMs power on and off. Thus, illustrative embodiments are able to collect boot history information for all VMs in a system through monitoring the VMs' associated Swap VVols. By learning the history of VM bootup activities (e.g., through monitoring Swap VVols associated with the VMs), each VM's probability distribution function of a boot-up event at time point t may be determined. The probability of a VM i booting up at time point t (where t is measured in minutes) is represented as:

$$P\_bootup\{VM\ i,\ t\}$$

The probability density function of VM bootup events is then determined according to the following equation:

$$P\_bootup\{VM\ i,\ (t-10) \le t \le (t-10)\} = \int_{t-10}^{t+10} P\_bootup\{VM\ i,\ t\} dt$$

P_bootup{VM i, (t−10)≤t≤(t−10)} represents the probability of VM i booting up during the time period {t−10, t+10}. Here, the 10 minute floating time is selected or defined based on an assumption that a complex VM may take 10-20 minutes to finish booting up. The particular floating time value (e.g., "10" in the equation above) may be adjusted as desired by an end-user for a particular implementation (e.g., based on the expected time to complete booting up VMs in that end-user's environment).

Similarly, by learning from history data of each storage cluster node's bootup storm activities, each storage cluster node j's probability distribution function of a boot-up storm event at time point t is represented as:

$$P\_bootup\_storm\{Node\ j,\ t\}$$

The event probability of a VM bootup storm on storage node j at time point t is defined as when a concurrent VM bootup count reaches a threshold value M (e.g., such as 30 VMs). The threshold value M can be adjusted by an end-user as desired. Generally, the more powerful a server or storage node is, the more concurrent VM bootup operations can be supported.

Figure 4:
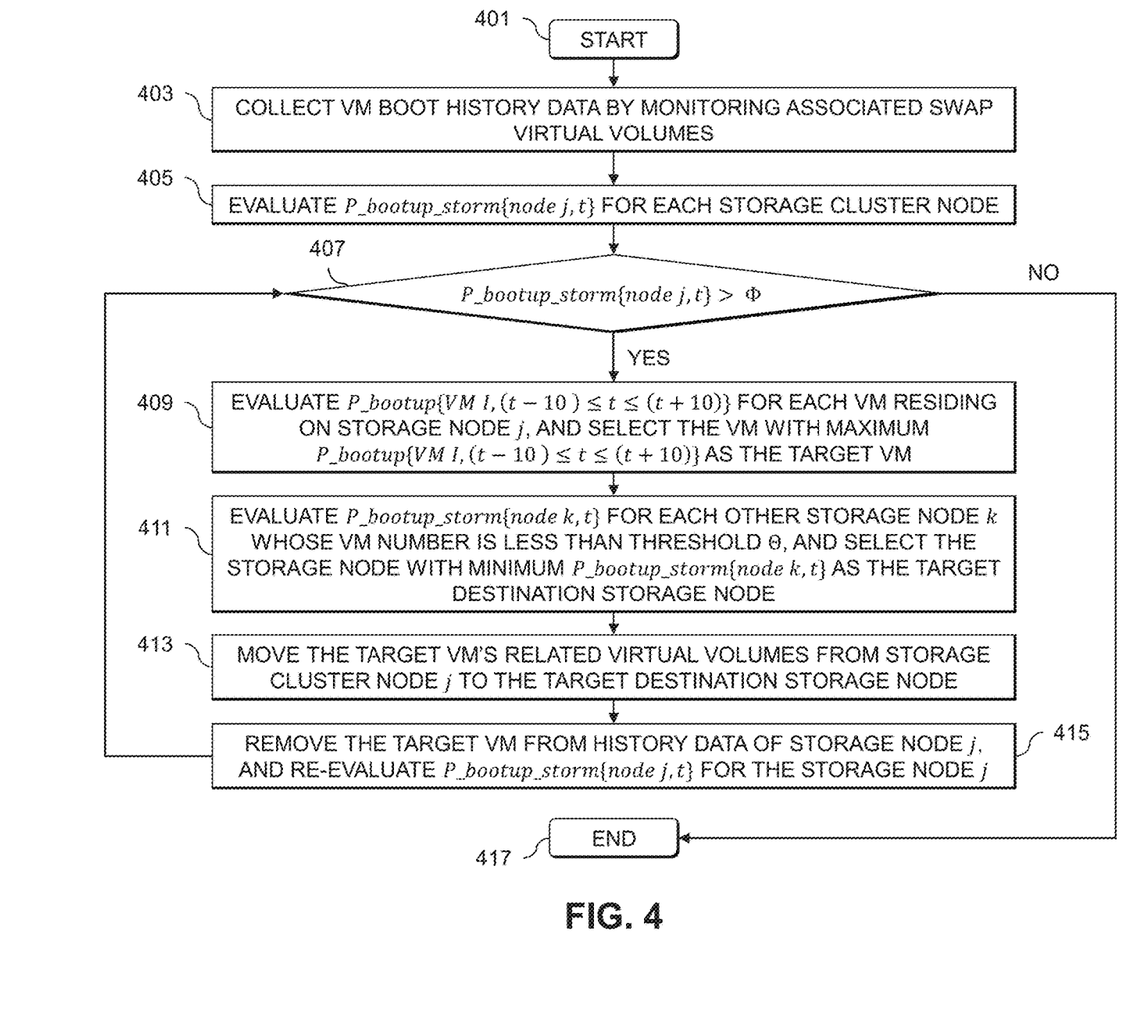
FIG. 4 illustrates a process flow for relocating virtual volumes to avoid boot storm conditions on storage nodes of a storage cluster in an illustrative embodiment.

A process flow for VM boot balancing across storage nodes (e.g., storage nodes 350) in a virtual volume enabled storage cluster (e.g., VVol enabled storage cluster 305) will now be described with respect to FIG. 4. The FIG. 4 process utilizes historical VM boot activity learned through monitoring Swap VVols associated with VMs to forecast possible upcoming boot storm times, and to adjust VM location distribution across storage nodes in a cluster to avoid such possible upcoming boot storms. The VM location balancing advantageously helps to avoid concurrent VM bootup activities that exceed a designated threshold. The FIG. 4 process starts in step 401. In step 403, VM bootup history data is collected by monitoring, for a given VM, whether an associated Swap VVol exists or not. Each storage cluster node's probability distribution function of a bootup storm event (e.g., P_bootup_storm{Node j, t}) is evaluated in step 405 based on the data collected in step 403.

In step 407, a determination is made as to whether any of the storage cluster node's P_bootup_storm{Node j, t} values exceed an acceptable threshold Φ. If the result of the step 407 determination is no (e.g., corresponding to a situation where no bootup storm is forecast for any of the storage cluster nodes), the FIG. 4 process flow ends in step 417. If the result of the step 417 determination is yes (e.g., for at least one of the storage nodes in the storage cluster), then the FIG. 4 process flow proceeds to step 409. In step 409, for each VM residing on storage node j (e.g., having an associated P_bootup_storm{node j, t}>Φ), that VM's P_bootup{VM i, (t−10)≤t≤(t−10)} is evaluated. The VM with the maximum P_bootup{VM i, (t−10)≤t≤(t−10)} is then selected as the current target VM.

For each other storage cluster node k that meets a designated condition (e.g., having a number of VMs less than a threshold Θ), P_bootup_storm{node k, t} is evaluated in step 411. The storage node with the minimum P_bootup_storm{node k, t} value is selected as the current target destination storage node. Here, the threshold Θ is used to guarantee that each storage cluster node's workload will not be too heavy after VM relocation. The value of the threshold Θ may be selected by a user. In some embodiments, the threshold Θ may be defined according to:

$$\Theta = 120\% \times \text{average } VVol \text{ number per storage node}$$

$$= 120\% \times \frac{\text{total number of } VVols}{\text{number of storage nodes}}$$

In step 413, the target VM's related VVols are moved from storage cluster node j to the target destination storage node. The target VM is then removed from the history data for storage cluster node j, and storage cluster node j's probability distribution function P_bootup_storm{node j, t} is re-evaluated in step 415. The FIG. 4 process flow then returns to step 407, to see whether the re-evaluated P_bootup_storm{node j, t} value still exceeds the acceptable threshold Φ. VM balancing operations then either continue (in further iterations of steps 409-413) or the balancing algorithm is ended for node j. Step 407 is then repeated for each storage node (e.g., so as to determine whether any other storage nodes j have P_bootup_storm{node j, t}>Φ). When there are no remaining storage nodes j with P_bootup_storm{node j, t}>Φ, the FIG. 4 process flow ends in step 417.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for moving virtual volumes among storage nodes of a storage cluster based at least in part on determined likelihood of designated VM boot conditions will now be described in greater detail with reference to FIGS. 5 and 6. Although described in the context of system 100, these platforms may also be used to implement at least portions of other information processing systems in other embodiments.

Figure 5:
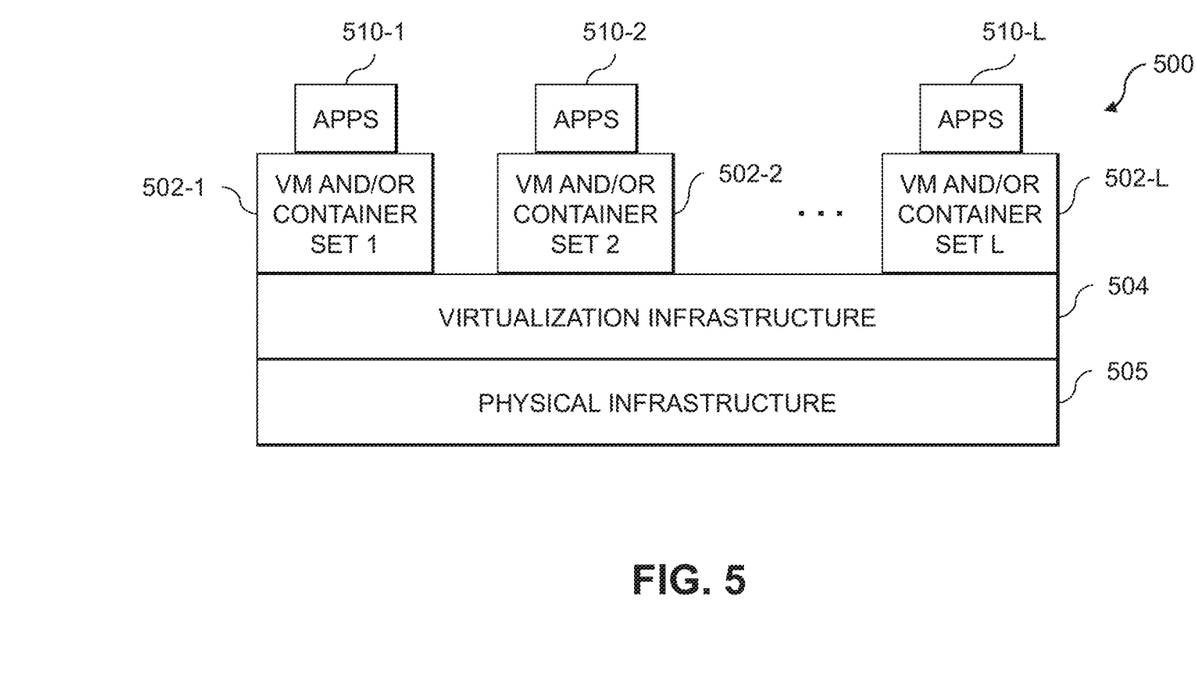
FIGS. 5 and 6 show examples of processing platforms that may be utilized to implement at least a portion of an information processing system in illustrative embodiments.
Figure 6:
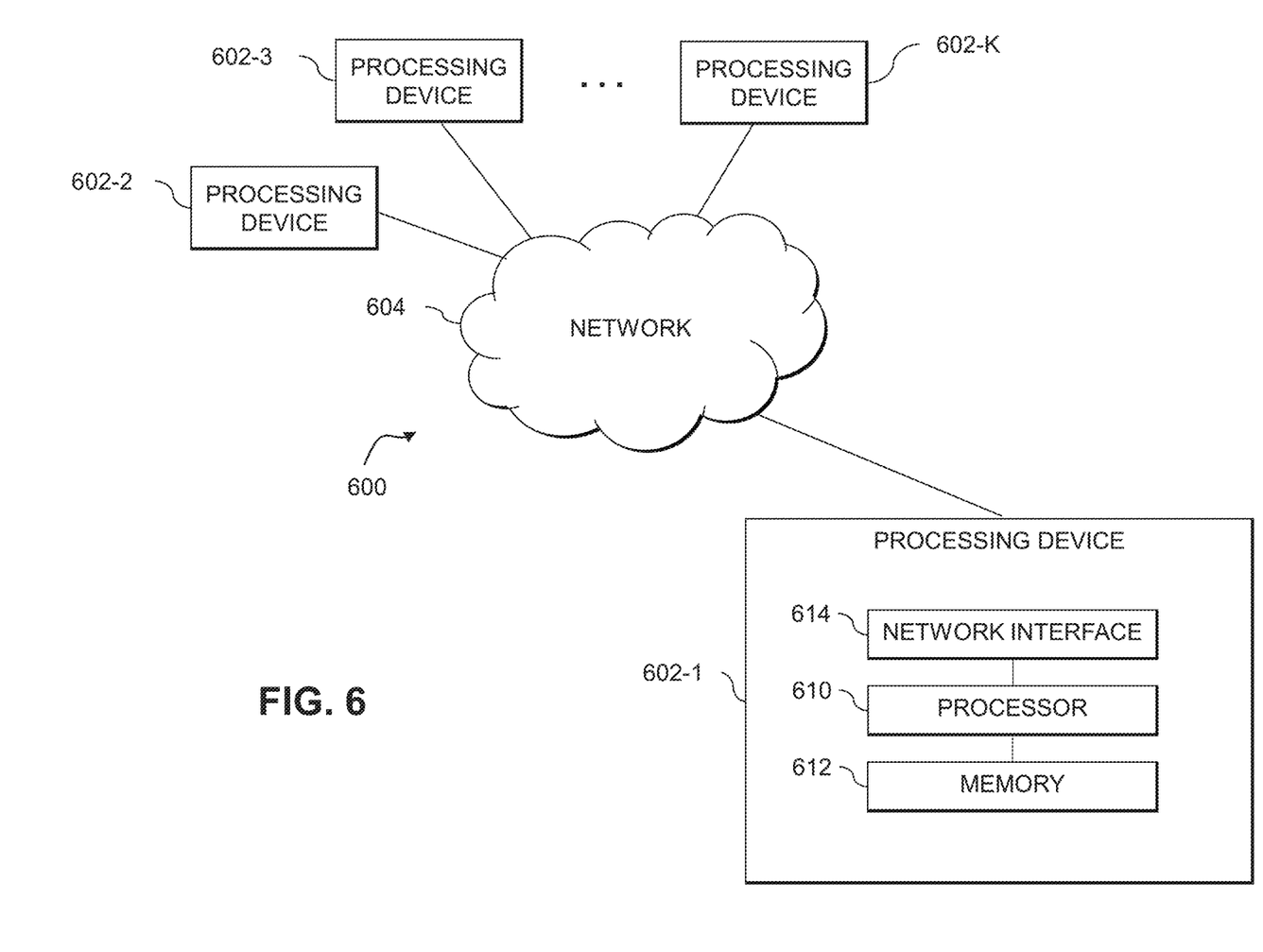

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for moving virtual volumes among storage nodes of a storage cluster based at least in part on determined likelihood of designated VM boot conditions as disclosed herein are illustratively implemented in the form of software running on one or more processing devices.

It should again be emphasized that the above-described embodiments are presented for purposes of illustration only.

Many variations and other alternative embodiments may be used. For example, the disclosed techniques are applicable to a wide variety of other types of information processing systems, storage systems, virtualization infrastructures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   obtaining information characterizing historical boot times for a plurality of virtual machines, the plurality of virtual machines being associated with a plurality of virtual volumes hosted on a storage cluster comprising a plurality of storage nodes;
   determining, based at least in part on the obtained information characterizing the historical boot times for the plurality of virtual machines, whether any of the plurality of storage nodes has at least a threshold likelihood of experiencing respective designated virtual machine boot conditions during a given time period, a first designated virtual machine boot condition for a first one of the plurality of storage nodes comprising concurrently booting up at least a first threshold number of the plurality of virtual machines on the first storage node, a second designated virtual machine boot condition for a second one of the plurality of storage nodes comprising concurrently booting up at least a second threshold number of the plurality of machines on the second storage node, the first and second threshold numbers of the plurality of virtual machines each comprising at least two of the plurality of virtual machines, the first and second threshold numbers being based at least in part on available resources of the first and second storage nodes, the first threshold number being different than the second threshold number, a length of the given time period being selected based at least in part on an expected time to complete booting up each of the plurality of virtual machines;
   responsive to determining that the first storage node has at least the threshold likelihood of experiencing the first designated virtual machine boot condition during the given time period, identifying a subset of the plurality of virtual machines associated with a subset of the plurality of virtual volumes hosted on the first storage node; and
   moving at least one of the subset of the plurality of virtual volumes associated with at least one of the subset of the plurality of virtual machines from the first storage node to another one of the plurality of storage nodes;
   wherein obtaining the information characterizing the historical boot times for the plurality of virtual machines comprises monitoring creation times of one or more designated types of the plurality of virtual volumes, the one or more designated types of the plurality of virtual volumes comprising a first type of virtual volumes associated with particular files corresponding to respective ones of the plurality of virtual machines, the first type of virtual volumes for a given one of the plurality of virtual machines being created when the given virtual machine is powered on.

2. The apparatus of claim 1 wherein the one or more designated types of the plurality of virtual volumes comprise at least one type of virtual volume that contains copies of virtual machine memory pages not retained in memory of the plurality of virtual machines.

3. The apparatus of claim 1 wherein the first type of virtual volumes comprises swap virtual volumes, and wherein the particular files comprise swap files.

4. The apparatus of claim 1 wherein moving at least one of the subset of the plurality of virtual volumes associated with at least one of the subset of the plurality of virtual machines from the first storage node to the other storage node comprises:
   generating a probability density function of bootup time for each of the subset of the plurality of virtual machines;
   determining a likelihood of each of the subset of the plurality of virtual machines booting up during the given time period utilizing the probability density functions of bootup time for the subset of the plurality of virtual machines; and
   selecting the at least one of the subset of the plurality of virtual machines based at least in part on the determined likelihood of each of the subset of the plurality of virtual machines booting up during the given time period.

5. The apparatus of claim 4 wherein selecting the at least one of the subset of the plurality of virtual machines based at least in part on the determined likelihood of each of the subset of the plurality of virtual machines booting up during the given time period comprises selecting a given one of the subset of the plurality of virtual machines whose probability density function has a highest probability of booting up during the given time period.

6. The apparatus of claim 4 wherein moving at least one of the subset of the plurality of virtual volumes associated with at least one of the subset of the plurality of virtual machines from the first storage node to the other storage node further comprises:
   identifying a subset of the plurality of storage nodes as candidate destination storage nodes, each of the candidate destination storage nodes currently hosting less than a designated number of the plurality of virtual volumes; and
   selecting the other storage node from among the candidate destination storage nodes.

7. The apparatus of claim 6 wherein the designated number of the plurality of virtual volumes is determined based at least in part on an average number of virtual volumes hosted on each of the plurality storage nodes.

8. The apparatus of claim 6 wherein selecting the other storage node from among the candidate destination storage nodes is based at least in part on determining a likelihood of each of the candidate storage nodes experiencing the designated virtual machine boot condition during the given time period.

9. The apparatus of claim 8 wherein selecting the other storage node from among the candidate destination storage nodes comprises selecting the candidate storage node with a lowest likelihood of experiencing the designated virtual machine boot condition during the given time period.

10. The apparatus of claim 1 wherein moving at least one of the subset of the plurality of virtual volumes associated with at least one of the subset of the plurality of virtual machines from the first storage node to the other storage node comprises moving all of the virtual volumes associated with a given one of the subset of the plurality of virtual machines from the first storage node to the other storage node.

11. A computer program product comprising a non-transitory processor-readable storage medium having stored therein program code of one or more software programs, wherein the program code when executed by at least one processing device causes the at least one processing device to perform steps of:

obtaining information characterizing historical boot times for a plurality of virtual machines, the plurality of virtual machines being associated with a plurality of virtual volumes hosted on a storage cluster comprising a plurality of storage nodes;

determining, based at least in part on the obtained information characterizing the historical boot times for the plurality of virtual machines, whether any of the plurality of storage nodes has at least a threshold likelihood of experiencing respective designated virtual machine boot conditions during a given time period, a first designated virtual machine boot condition for a first one of the plurality of storage nodes comprising concurrently booting up at least a first threshold number of the plurality of virtual machines on the first storage node, a second designated virtual machine boot condition for a second one of the plurality of storage nodes comprising concurrently booting up at least a second threshold number of the plurality of machines on the second storage node, the first and second threshold numbers of the plurality of virtual machines each comprising at least two of the plurality of virtual machines, the first and second threshold numbers being based at least in part on available resources of the first and second storage nodes, the first threshold number being different than the second threshold number, a length of the given time period being selected based at least in part on an expected time to complete booting up each of the plurality of virtual machines;

responsive to determining that the first storage node has at least the threshold likelihood of experiencing the first designated virtual machine boot condition during the given time period, identifying a subset of the plurality of virtual machines associated with a subset of the plurality of virtual volumes hosted on the first storage node; and moving at least one of the subset of the plurality of virtual volumes associated with at least one of the subset of the plurality of virtual machines from the first storage node to a another one of the plurality of storage nodes;

wherein obtaining the information characterizing the historical boot times for the plurality of virtual machines comprises monitoring creation times of one or more designated types of the plurality of virtual volumes, the one or more designated types of the plurality of virtual volumes comprising a first type of virtual volumes associated with particular files corresponding to respective ones of the plurality of virtual machines, the first type of virtual volumes for a given one of the plurality of virtual machines being created when the given virtual machine is powered on.

12. The computer program product of claim 11 wherein the first type of virtual volumes comprises swap virtual volumes, and wherein the particular files comprise swap files.

13. A method comprising:

obtaining information characterizing historical boot times for a plurality of virtual machines, the plurality of virtual machines being associated with a plurality of virtual volumes hosted on a storage cluster comprising a plurality of storage nodes;

determining, based at least in part on the obtained information characterizing the historical boot times for the plurality of virtual machines, whether any of the plurality of storage nodes has at least a threshold likelihood of experiencing respective designated virtual machine boot conditions during a given time period, a first designated virtual machine boot condition for a first one of the plurality of storage nodes comprising concurrently booting up at least a first threshold number of the plurality of virtual machines on the first storage node, a second designated virtual machine boot condition for a second one of the plurality of storage nodes comprising concurrently booting up at least a second threshold number of the plurality of machines on the second storage node, the first and second threshold numbers of the plurality of virtual machines each comprising at least two of the plurality of virtual machines, the first and second threshold numbers being based at least in part on available resources of the first and second storage nodes, the first threshold number being different than the second threshold number, a length of the given time period being selected based at least in part on an expected time to complete booting up each of the plurality of virtual machines;

responsive to determining that the first storage node has at least the threshold likelihood of experiencing the first designated virtual machine boot condition during the given time period, identifying a subset of the plurality of virtual machines associated with a subset of the plurality of virtual volumes hosted on the first storage node; and moving at least one of the subset of the plurality of virtual volumes associated with at least one of the subset of the plurality of virtual machines from the first storage node to another one of the plurality of storage nodes;

wherein obtaining the information characterizing the historical boot times for the plurality of virtual machines comprises monitoring creation times of one or more designated types of the plurality of virtual volumes, the one or more designated types of the plurality of virtual volumes comprising a first type of virtual volumes associated with particular files corresponding to respective ones of the plurality of virtual machines, the first type of virtual volumes for a given one of the plurality of virtual machines being created when the given virtual machine is powered on; and wherein the method is performed by at least one processing device comprising a processor coupled to a memory.

14. The method of claim 13 wherein the first type of virtual volumes comprises swap virtual volumes, and wherein the particular files comprise swap files.

15. The computer program product of claim 11 wherein the one or more designated types of the plurality of virtual volumes comprise at least one type of virtual volume that contains copies of virtual machine memory pages not retained in memory of the plurality of virtual machines.

16. The method of claim 13 wherein the one or more designated types of the plurality of virtual volumes comprise at least one type of virtual volume that contains copies of virtual machine memory pages not retained in memory of the plurality of virtual machines.

17. The apparatus of claim 1 wherein the expected time to complete booting up a given one of the plurality of virtual machines is determined based at least in part on a complexity of the given virtual machine and available resources in the storage cluster.

* * * * *